United States Patent

[11] 3,553,375

[72] Inventors Akira Okamura
Shintokorozawa-Danchi, 84-402 No. 11-2-chome midori-cho, Tokorozawa-shi, and Tokoaki Kosaka, No. 220-5-chrome, makuhari-cho, Chiba-shi, and Hiroshi Aiba, No. 10-13, 2-chrome, Igusa, Suginami-ku, Tokyo, Japan

[21] Appl. No. 622,997
[22] Filed Mar. 14, 1967
[45] Patented Jan. 5, 1971
[32] Priority Mar. 14, 1966
[33] Japan
[31] No. 41/15684

[54] AUTOMATIC TELEPHONE ANSWERING APPARATUS
3 Claims, 6 Drawing Figs.

[52] U.S. Cl. .......... 179/2, 179/6
[51] Int. Cl. .......... H04m 11/10
[50] Field of Search .......... 179/2, 2TC, 2R, 6, 89, 158A, 175.21; 318/160, 468, 486

[56] References Cited

UNITED STATES PATENTS

| | | | |
|---|---|---|---|
| 2,282,100 | 5/1942 | Thompson .......... | 179/6 |
| 2,558,040 | 6/1951 | Carter .......... | 179/6 |
| 2,936,336 | 5/1960 | Cooke .......... | 179/6 |

*Primary Examiner*—Ralph D. Blakeslee
*Attorney*—Sughrue, Rothwell, Mion, Zinn & Macpeak

ABSTRACT: An automatic telephone answering apparatus which can be set by mechanical limit switch means a certain time period after the initial bell signal initiates operation of the apparatus.

INVENTORS.
AKIRA OKAMURA
TOMOAKI KOSAKA
HIROSHI AIBA
BY Sughrue, Rothwell, Mion, Zinn & Macpeak
ATTORNEYS.

INVENTORS.
AKIRA OKAMURA
TOMOAKI KOSAKA
HIROSHI AIBA

BY
Sughrue, Rothwell, Mion, Zinn & Macpeak
ATTORNEYS.

AUTOMATIC TELEPHONE ANSWERING APPARATUS

This invention relates to an automatic telephone answering apparatus which can be controlled mainly by mechanical means for a certain period after receiving a bell signal.

One object of the present invention is to provide a novel automatic telephone answering apparatus employing mechanical means instead of hitherto known electrical and mechanical means for setting any answering period or any long period. In other words, the mechanical means according to the present invention includes a mechanical main timer cam, a microswitch which is provided with a roller in a slot provided in said cam for initiating the answering operation after receiving the first bell signal and pin for setting the answering period which is adjustably provided in an elongated arcuate slot. Therefore, the answering message is initiated by lifting a hand set of the telephone or by closing the DC circuit of the telephone circuit and the operation is finished as soon as the answering period is over.

With the above and other objects in view, as we will be presently apparent, the invention consists of certain novel combination of elements and arrangements of parts hereinafter fully described, illustrated in the accompanying drawings and specifically claimed. In the accompanying drawings:

Figure 1:
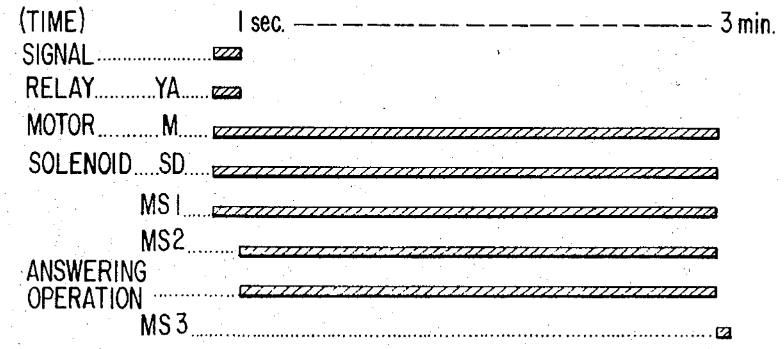
FIG. 1 shows a graph showing the relation between various mechanical actions and time for the automatic telephone answering apparatus according to the present invention.
Figure 2:
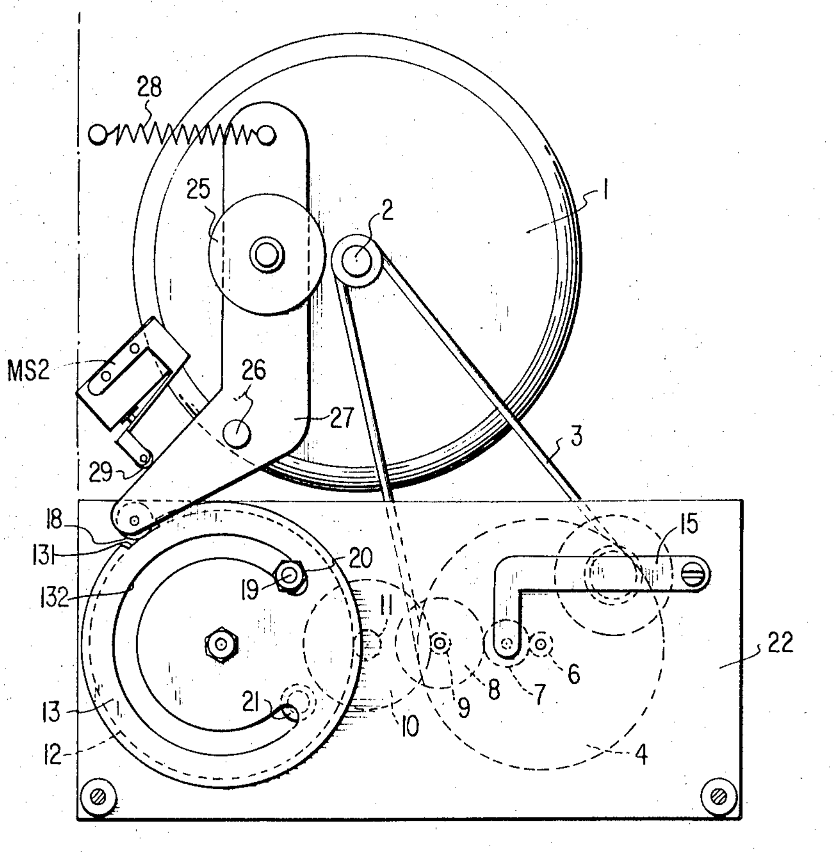
FIG. 2 shows a top view of a timer device of said apparatus.
Figure 3:
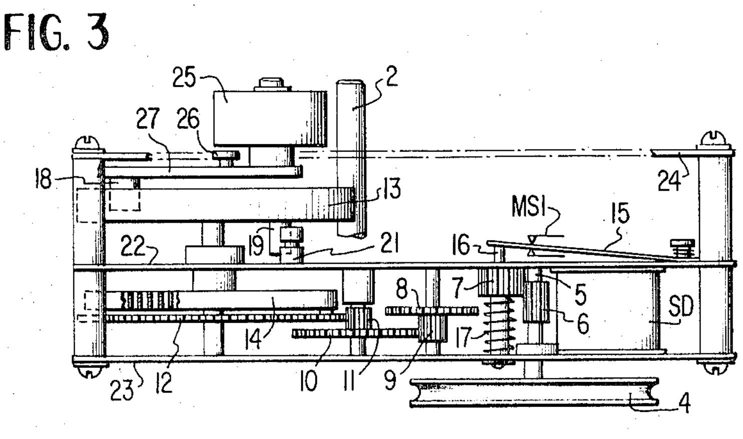
FIG. 3 shows a side view of the apparatus of FIG. 2.
Figure 4:
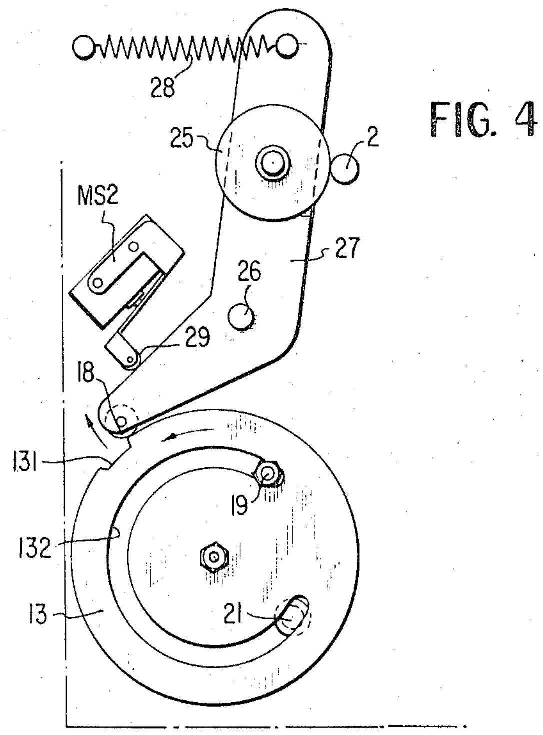
FIG. 4 and FIG. 5 show the relationship between a pinch roller on an arm and a switch immediately after receiving the first bell signal ann and immediately after the elapse of the answering period respectively.
Figure 5:
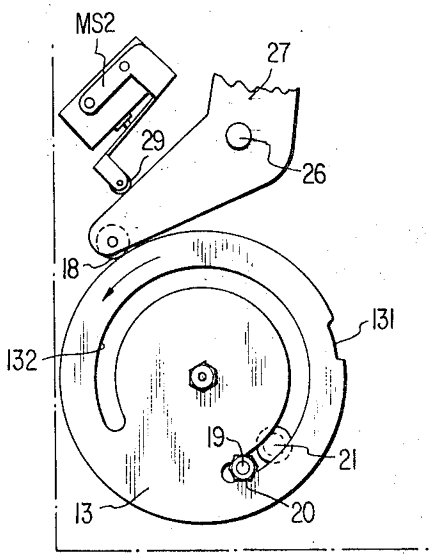

In FIG. 1, which shows a graph of the relation between various mechanical operations and time, it is assumed that the answering message is initiated after the first bell signal and that the answering period is 3 minutes. When the relay YA is activated by the bell signal, the circuit for the motor M and the solenoid SD is completed by closure of the contact YA1 of relay YA The motor M will then be rotated and the solenoid SD by its ON action causes the gearing of a timer device to rotate. The gearing of the timer device will continue to rotate with the help of a microswitch MS1 which maintains the circuit to solenoid SD closed. After receiving the first bell signal the cam, which has been rotated by said gearing, activates microswitch MS2 to close the telephone circuit an and at the same time initiates the running of an endless tape for answering. If the answering period, which may be as long as 3 minutes, of the apparatus elapses, a pin for activating MS3 which has been set on the cam plate corresponding to the desired answering period rotates to open the switch MS3 provided in the electric source circuit. The motor is now in the OFF state, so the operation of the apparatus is finished. That is, the motor M and the solenoid SD are in the OFF state, the tape stops its running and the automatic telephone answering apparatus returns to the standby state. FIGS. 2 and 3 show a top view and a side view of the said timer device, respectively, which is activated by a timer circuit shown in FIG. 6. A flywheel 1 is driven by motor M. The rotating shaft or capstan shaft 2 drives a pulley 4 through a belt 3. The shaft 5 of the pulley 4 is provided with a driving pinion 6. If the solenoid SD is energized the shaft end 16 of the clutch gear 7 is pushed down against the force by return spring 17 due to attracting force of armature 15. Then the clutch gear 7, pinion 6 and the first intermediate gear 8 are engaged to transmit rotation to following gearing. Then, the rotation is transmitted to the main gear 12 against the force of return spring 14 through the first pinion 9 which is provided on the same shaft as the intermediate gear 8 and the second pinion 11, which is on the same shaft as the second intermediate gear 10 in order to rotate a timer cam 13 which is provided on the same shaft as the main gear 12. FIGS. 2, 4 and 5 show the said cam respectively in the state before initiation of rotation, immediately after elapse of 1 second and at the end of answering period. A cam notch 131 for maintaining the standby state and a circular slot 132 for setting the answering period of said apparatus are provided in the cam plate 13. The roller 18 is engaged with said cam notch 131. The pin 19 for operating the actuator 21 of switch MS3 is fixed, corresponding to the desired length of the answering period, to the cam plate 13 by means of screw 20 in the circular slot 132. The pin 19 operates the actuator 21 which is provided on the upper plate 22. A return spring 14 is provided in association with said cam plate 13 over the main gear 12 in order to reverse gearing of the timer device. A pinch roller 25 is supported adjacent to capstan 2 on a pinch roller supporting arm 27 which rotates around a shaft 26 suitably secured to a base plate 24 of the device. A roller 18 is provided at the other end of the supporting plate 27 and is engaged with the cam notch 131 of the cam plate 13 by spring 28. Rotation of the supporting arm 27 closes microswitch MS2 which is provided with an actuator 29 adjacent to said arm 27.

Figure 6:
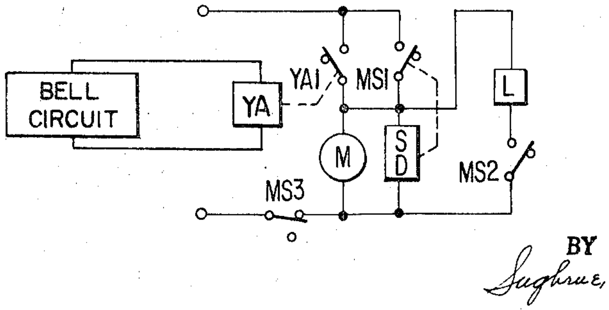
FIG. 6 shows a diagram of a timer circuit which causes said timer device to operate.

The operation of the timer device, the circuit of which is shown in FIG. 6, will be s described hereafter. When a bell signal comes, the relay YA is activated, and its contact YA1 energizes the motor M and the solenoid SD. Then the motor M transmits the rotation to the pulley 4 through the flywheel 1 and the belt 3 to rotate the driving pinion 6 provided with the shaft 5. At the same time, the armature 15 is moved by the energization of the solenoid SD, and the microswitch MS1 is actuated by said armature 15. At the same time the clutch gear 7 is pushed down against the return spring 17 to rotate the intermediate gear 8 and following gearing so that the timer cam 13 is rotated. If the gearing is properly designed the roller 18 will rise on the circumference of the cam disc 13 immediately after the elapse of 1 second for the bell signal. Then the roller 18 proceeds on the circumference of said cam causing the roller supporting arm 27 to rotate around the shaft 26, so that the microswitch MS2, which is connected in series with an answering operation circuit L, is closed. Therefore, the automatic telephone answering apparatus will be in an operative state and at the same time the roller 25 comes into contact with the capstan 2 to run the tape. In this case, the microswitch MS1 which is connected in parallel with the contact YA1 is constituted to act as a holding switch for the solenoid SD, so that when the microswitch MS1 is activated due to energization of solenoid SD and the motor M continues rotation. As the answering period elapses, the pin 19 comes into the position shown in FIG. 5. As the pin 19 operates the actuator 21 for the microswitch MS3, the switch MS3 which has been in ON or closed state moves into the OFF or open state. Then the solenoid SD is deenergized, the clutch gear 7 returns to its original position and the timer cam 13 reverses the gearing by the return spring 14. Then the roller 18 of the pinch roller arm 27 is engaged with the cam notch 131 so the pinch roller 25 leaves the capstan 2. The microswitch MS1 moves into the OFF or open state and the automatic telephone answering apparatus returns to the stand standby state.

In the above-stated description a retardation period is omitted. However, it is possible to employ a cam for retardation and if necessary to leave the motor and solenoid ON during the retardation period, and to close the telephone circuit and to run the tape after elapse of the retardation period. Also the setting of the answering period may be prolonged and made easier as compared with that according to the prior art apparatus, because of employing a circular slot corresponding to the answering period on the timer cam and retardation by gearing.

As has been stated above, the present invention provides an automatic telephone answering apparatus which is able to set an answering period longer and more exactly because it sets the answering period with a timer device including a timer cam and a reversing mechanism instead of conventional electric means such as an RC circuit employing a time constant or the like.

This invention is not to be confined to any strict conformity with the showings in the drawings by may be changed or modified so long as such changes or modifications mark no material departure from the salient features of the invention as expressed in the appended claims.

We claim:

1. An automatic telephone answering and message recording apparatus for use with a standard telephone having a telephone circuit and a bell circuit comprising rotary cam means, means for initiating forward rotation of said cam means in response to initial energization of said bell circuit, first switch means, cam follower means operable by said cam means to operate said first switch means upon initial forward rotation of said cam means to energize said telephone circuit and initiate operation of said message recording apparatus, second switch means, operating means adjustably mounted on said cam means for actuating said second switch means to stop forward rotation of said cam means and open said telephone circuit and means for automatically rotating said cam means in reverse upon actuation of said second switch means, said rotary cam means comprising a disc having a notch in the periphery thereof, lever means pivotally mounted adjacent said disc, roller means secured to one end of said lever means and adapted to be disposed in said notch during standby, said first switch means mounted adjacent said lever means for operation thereby such that said first switch is open during standby and closed during rotation of said cam means to energize said telephone circuit.

2. An apparatus as set forth in claim 1 wherein said disc is further provided with a circular slot therethrough adjacent the outermost edge of said disc, pin means adjustably secured in said slot, means for actuating said second switch means disposed in the path of movement of said pin means whereby said pin means engages said actuating means to operate said second switch means to open said circuit means for said motor and said electromagnetic clutch means.

3. An automatic telephone answering and message recording apparatus for use with a standard telephone having a telephone circuit and a bell circuit comprising rotary cam means, means for initiating forward rotation of said cam means in response to an initial energization of said bell circuit, first switch means, cam follower means operable by said cam means to operate said first switch means upon initial forward rotation of said cam means to energize said telephone circuit and initiate operation of said message recording apparatus, a second switch means, operating means adjustably mounted on said cam means for actuating said second switch means to stop forward rotation of said cam means and open said telephone circuit and means for automatically rotating said cam means in reverse upon actuation of said second switch means, said means for initiating forward rotation of said cam means comprising an electric motor, reduction gear means drivingly connected to said cam means, electromagnetic clutch means for transmitting the torque from said motor to said gear means and circuit means for said motor and said electromagnetic clutch means having switch means therein responsive to the initial energization of said bell circuit to close the engages circuit to said motor and said clutch means to rotate said motor and transmit rotary torque to said cam means, said cam means comprising a rotatable disc having a circular slot therethrough adjacent the outer most edge of said disc, pin means adjustably secured in said slot means for actuating said second switch means disposed in the path of movement of said pin means whereby said pin means engages said actuating means to operate said second switch means to open said circuit means for said motor and said electromagnetic clutch means.